(12) United States Patent
Gharan et al.

(10) Patent No.: US 12,483,336 B2
(45) Date of Patent: Nov. 25, 2025

(54) METHOD AND SYSTEM FOR FINE FREQUENCY FINESSE FILTERING

(71) Applicant: CIENA CORPORATION, Hanover, MD (US)

(72) Inventors: Shahab Oveis Gharan, Ottawa (CA); Kim Byron Roberts, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 315 days.

(21) Appl. No.: 18/193,322

(22) Filed: Mar. 30, 2023

(65) Prior Publication Data

US 2024/0333397 A1    Oct. 3, 2024

(51) Int. Cl.
*H04B 10/06* (2006.01)
*H04B 10/61* (2013.01)

(52) U.S. Cl.
CPC ....... *H04B 10/615* (2013.01); *H04B 10/6163* (2013.01)

(58) Field of Classification Search
CPC  H04B 10/615; H04B 10/616; H04B 10/6161; H04B 10/6162; H04B 10/6163; H04B 10/6164; H04B 10/6165; H04B 10/40; H04B 10/614; H04B 10/613; H04B 10/6971; H04B 10/2569; H04B 10/6166; H04B 10/6151
USPC ....... 398/202, 203, 204, 205, 206, 207, 208, 398/209, 210, 211, 212, 213, 214, 158, 398/159, 135, 136, 33, 65, 152, 38, 25, 398/26, 27, 147, 81, 183, 184, 188
See application file for complete search history.

(56) References Cited

U.S. PATENT DOCUMENTS

| | | | |
|---|---|---|---|
| 7,555,227 B2 | 6/2009 | Bontu et al. | |
| 7,701,842 B2 | 4/2010 | Roberts et al. | |
| 7,899,340 B1 * | 3/2011 | Bontu | H04L 7/0075 398/208 |
| 8,385,747 B2 | 2/2013 | Roberts et al. | |
| 9,191,120 B2 * | 11/2015 | Zhou | H04B 10/6165 |
| 10,211,919 B2 | 2/2019 | Oveis Gharan et al. | |

(Continued)

FOREIGN PATENT DOCUMENTS

EP    3926860 A1    12/2021

OTHER PUBLICATIONS

"Ciena Wavelogic 6", https://www.ciena.com/about/newsroom/press-releases/ciena-unveils-wavelogic-6, Feb. 21, 2023, 6 pgs.

(Continued)

*Primary Examiner* — Hanh Phan
(74) *Attorney, Agent, or Firm* — Guntin & Gust, PLC; Andrew Gust

(57) ABSTRACT

Aspects of the subject disclosure may include, for example, obtaining a signal received at a coherent optical receiver, and equalizing the signal using a filter system, wherein the filter system includes a first filter that provides a first filtering characteristic, a second filter that provides a second filtering characteristic, and a third filter that provides a third filtering characteristic, wherein an adjustment rate of the first filter and an adjustment rate of the second filter are each at least ten times an adjustment rate of the third filter, and wherein the adjustment rate of the first filter is at least ten times the adjustment rate of the second filter. Other embodiments are disclosed.

20 Claims, 11 Drawing Sheets

(56) References Cited

U.S. PATENT DOCUMENTS

| | | |
|---|---|---|
| 10,938,483 B1 * | 3/2021 | Babaee .............. H04B 10/6971 |
| 11,126,219 B2 | 9/2021 | Oveis Gharan et al. |
| 11,190,277 B1 | 11/2021 | Nguyen et al. |
| 11,239,929 B1 | 2/2022 | Babaee et al. |
| 2015/0063818 A1 | 3/2015 | Zhou |

OTHER PUBLICATIONS

PCT/US2024/021645, International Search Report and Written Opinion, mailed Jul. 12, 2024, 12 pages.

\* cited by examiner

METHOD AND SYSTEM FOR FINE FREQUENCY FINESSE FILTERING

FIELD OF THE DISCLOSURE

The subject disclosure relates to fine frequency finesse filtering.

BACKGROUND

In coherent optical communications, a receiver that receives an optical signal with modulated data may mix the signal with a strong, narrow-line-width, local oscillator signal by way of an optical hybrid, where the combined signal may then be made incident on one or more photodetectors. In certain implementations, the received optical signal may first be split into orthogonal polarizations that are then processed by a respective optical hybrid. In-phase and quadrature components of each polarization may be detected using respective photodetectors that are positioned to receive corresponding signals output by the optical hybrid. In any case, the frequency spectrum of the electrical current outputs of the photodetector(s) is substantially proportional to the convolution of the received optical signal and the local oscillator, and contains a signal component lying at an intermediate frequency (abbreviated IF or as an algebraic symbol $f_{IF}$) that "contains" the data. This data component can be isolated and detected by way of electronic filtering and processing of the photodetector outputs.

BRIEF DESCRIPTION OF THE DRAWINGS

Reference will now be made to the accompanying drawings, which are not necessarily drawn to scale, and wherein.

DETAILED DESCRIPTION

Figure 1:
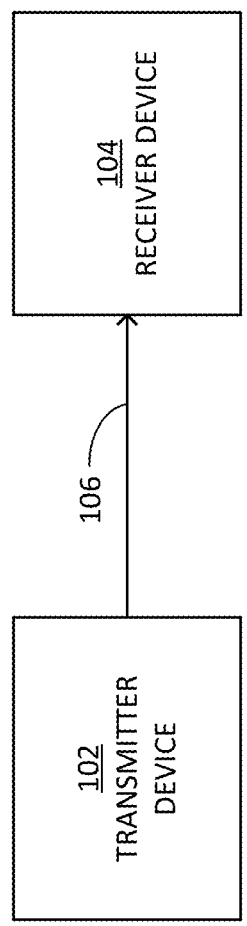
FIG. 1 is a diagram of an non-limiting example of a communication network in accordance with various aspects described herein.

FIG. 1 is a diagram of an non-limiting example of a communication network 100 in accordance with various aspects described herein. The communication network 100 may include at least one transmitter device 102 and at least one receiver device 104. The transmitter device 102 may be capable of transmitting signals over a communication channel, such as a communication channel 106. In one or more embodiments, the transceiver 102 may be a modem. The receiver device 104 may be capable of receiving signals over a communication channel, such as the communication channel 106. In various embodiments, the transmitter device 102 may also be capable of receiving signals and/or the receiver device 104 may also be capable of transmitting signals. Thus, one or both of the transmitter device 102 and the receiver device 104 may be capable of acting as a transceiver.

The communication network 100 may include additional elements not shown in FIG. 1. For example, the communication network 100 may include one or more additional transmitter devices, one or more additional receiver devices, and one or more other devices or elements involved in the communication of signals in the communication network 100.

In some embodiments, the signals that are transmitted and received in the communication network 100 may include optical signals and/or electrical signals. For example, the transmitter device 102 may be a first optical transceiver, the receiver device 104 may be a second optical transceiver, and the communication channel 106 may be an optical communication channel. In certain embodiments, one or both of the first optical transceiver and the second optical transceiver may be a coherent modem.

In various embodiments, each optical communication channel in the communication network 100 may include one or more links, where each link may include one or more spans, and where each span may include a length of optical fiber and one or more optical amplifiers. Where the communication network 100 involves the transmission of optical signals, the communication network 100 may include additional optical elements not shown in FIG. 1, such as wavelength selective switches, optical multiplexers, optical demultiplexers, optical filters, and/or the like.

Various elements and effects in an optical link between two communicating devices may result in the degradation of transmitted signals. That is, optical signals received over optical links can become distorted. Particularly, these signals may suffer from polarization mode dispersion (PMD), polarization dependent loss or gain (PDL or PDG), state of polarization (SOP) rotation, amplified spontaneous emission (ASE) noise, wavelength-dependent dispersion or chromatic dispersion (CD), nonlinear noise from propagation through fiber, and/or other effects. For instance, polarization effects of a fiber link tend to rotate the transmitted polarizations such that, at the receiver, they are neither orthogonal to each other nor aligned with the polarization beam splitter of the optical hybrid. As a result, each of the received polarizations (e.g., downstream of the polarization beam splitter) may contain energy from both of the transmitted polarizations, as well as distortions due to CD, PMD, PDL, etc. These problems may be compounded for polarization-division multiplexed signals in which each transmitted polarization contains a respective data signal. The degree of signal degradation due to noise and nonlinearity may be characterized by a signal-to-noise ratio (SNR) or, alternatively, by a noise-to-signal ratio (NSR). The signals transmitted in the communications network may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

Figure 2A:
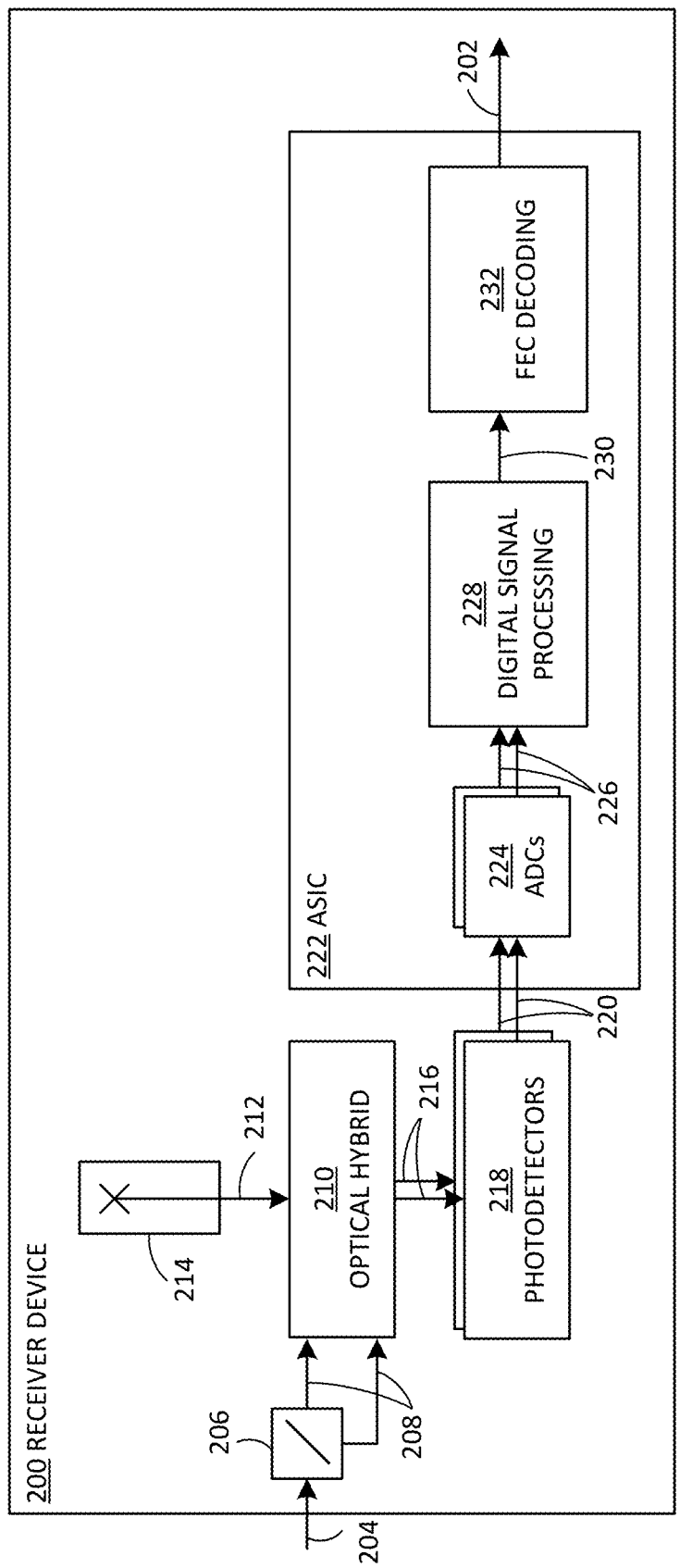
FIG. 2A illustrates an example receiver device in accordance with various aspects described herein.

FIG. 2A illustrates an example receiver device 200 in accordance with various aspects described herein. In various embodiments, the receiver device 200 may be the same as or similar to (or otherwise correspond to) the receiver 104 of FIG. 1, and may be configured to receive an optical signal 204, which may comprise a degraded version of an optical signal generated by a transmitter device (e.g., the transmitter device 102 of FIG. 1). The optical signal generated by the transmitter device may be representative of information bits (also referred to as client bits) which are to be communicated to the receiver device 200. The optical signal generated by the transmitter device may be representative of a stream of symbols. According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques, such as frequency division multiplexing (FDM), polarization-division multiplexing (PDM), single polarization modulation, modulation of an unpolarized carrier, mode-division multiplexing, spatial-division multiplexing, Stokes-space modulation, polarization balanced modulation, wavelength division multiplexing (WDM) (where a plurality of data streams is transmitted in parallel, over a respective plurality of carriers, where each carrier is generated by a different laser), and/or the like.

The receiver device 200 may be configured to recover corrected client bits 202 from the received optical signal 204. The receiver device 200 may include a polarizing beam splitter 206 configured to split the received optical signal 204 into polarized components 208. According to one example implementation, the polarized components 208 may include orthogonally polarized components corresponding to an X-polarization and a Y-polarization. An optical hybrid 210 may be configured to process the components 208 with respect to an optical signal 212 produced by a laser 214, thereby resulting in optical signals 216. Photodetectors 218 may be configured to convert the optical signals 216 output by the optical hybrid 210 to analog electrical signals 220. The frequency difference between the Rx laser and the Tx laser is the Intermediate Frequency, and an offset of that away from nominal can be called $f_{IF}$. (The nominal difference is usually zero.) According to one example implementation, the analog signals 220 may include four signals corresponding, respectively, to the dimensions XI, XQ, YI, and YQ, where XI and XQ denote the in-phase and quadrature components of the X-polarization, and YI and YQ denote the in-phase and quadrature components of the Y-polarization. Together, elements such as the beam splitter 206, the laser 214, the optical hybrid 210, and the photodetectors 218 may form a communication interface configured to receive optical signals from other devices in a communication network.

As shown in FIG. 2A, the receiver device 200 may include an application specific integrated circuit (ASIC) 222. The ASIC 222 may include analog-to-digital converters (ADCs) 224 that are configured to sample the analog signals 220 and generate respective digital signals 226. In certain alternate embodiments, the ADCs 224 or portions thereof may be separate from the ASIC 222. The ADCs 224 may sample the analog signals 220 periodically at a sample rate that is based on a signal received from a voltage-controlled oscillator (VCO) at the receiver device 200 (not shown). The ASIC 222 may be configured to apply digital signal processing to the digital signals 226 using a digital signal processing system 228. The digital signal processing system 228 may be configured to perform equalization processing that is designed to compensate for a variety of channel impairments, such as CD, SOP rotation, mean PMD that determines the probability distribution which instantiates as differential group delay (DGD), PDL or PDG, and/or other effects. The digital signal processing system 228 may further be configured to perform carrier recovery processing, which may include calculating an estimate of carrier frequency offset $f_{IF}$ (i.e., the difference between the frequency of the transmitter laser and the frequency of the receiver laser 214). According to some example implementations, the digital signal processing system 228 may further be configured to perform operations such as multiple-input-multiple-output (MIMO) filtering, clock recovery, and FDM subcarrier de-multiplexing. The digital signal processing system 228 may also be configured to perform symbol-to-bit demapping (or decoding) using a decision circuit, such that signals 230 output by the digital signal processing system 228 are representative of bit estimates. Where the received optical signal 204 is representative of symbols comprising FEC-encoded bits generated as a result of applying FEC encoding to client bits, the signals 230 may further undergo FEC decoding 232 to recover the corrected client bits 202.

According to some example implementations, the equalization processing implemented as part of the digital signal processing system 228 may include one or more equalizers, some or all of which may be configured to compensate for impairments in the channel response. In general, an equalizer applies a substantially linear filter to an input signal to generate an output signal that is less degraded than the input signal. The filter may be characterized by compensation coefficients which may be incrementally updated from time to time (e.g., every so many clock cycles or every so many seconds) with the goal of reducing the degradation observed in the output signal.

According to some example implementations, the equalization processing of the digital signal processing system 228 may include an equalizer filter (referred to herein as a "C filter") that is designed to apply a dispersive function to at least partially compensate for slowly changing channel impairments, such as CD. The C filter may be configured as a quasi-static dispersion-compensating filter and/or a spectral-shaping filter (i.e., that provides basic matched filter shaping). As an example, compensation coefficients for the C filter may be calculated through firmware using the estimated CD during start-up of the receiver device (also referred to as the acquisition stage), and those coefficients may be applied to received signals (either by convolution in the time domain or by multiplication in the frequency domain), thereby resulting in processed signals which are, at least partially, compensated for CD. The C filter may be referred to as static or quasi-static because the updating of its compensation coefficients is relatively infrequent. For instance, the coefficients may be updated periodically (e.g., once every second) based on information obtained downstream during the digital signal processing. The slow rate of change of the compensation coefficients means that the static (or quasi-static) equalizer filter may only be capable of tracking and compensating for relatively slow changes in the channel response, and not fast changes. For example, the static (or quasi-static) equalizer filter may be able to compensate for changes in CD, which are typically at a rate on the order of <1 Hz, but the static (or quasi-static) equalizer filter may be unable to compensate for changes in SOP rotation, which typically happen much more quickly.

According to some example implementations, the equalization processing of the digital signal processing system 228 may include an additional equalizer filter (referred to herein as an "H filter") which uses feedback to compensate for relatively fast changes in the channel response, such as SOP changes, PMD changes, PDL changes, small amounts of CD, and/or analog characteristics of the transmitter and receiver, which may change at a rate on the order of kHz. For example, the feedback equalizer H filter may compensate for impairments varying at a rate of approximately 100 kHz. In various embodiments, feedback equalization of the H filter may rely on a Least Mean Squares (LMS) feedback loop or adaptive Wiener filtering using a constant modulus algorithm (CMA), an affine projection algorithm (APA), or a recursive least squares (RLS) algorithm. For instance, feedback equalization may leverage frequency-domain RLS equalization. In various embodiments, feedback equalization may additionally, or alternatively, be implemented using blocks in the time domain.

In one or more embodiments, the tracking response of the H filter may be more than ten times faster than that of the C filter. For instance, one or more aspects of the optical coherent receiver described in U.S. Pat. No. 7,555,227 (which issued on Jun. 30, 2009 and is incorporated herein by reference in its entirety), may be employed in one or more systems/receivers described herein. For instance, one or more aspects of the equalization described in U.S. Pat. No. 7,555,227, which is separated into a C filter and an H filter, may be utilized in the receiver 200 of FIG. 2A herein.

If the number of Fast Fourier Transform (FFT) bins, N, for the H filter is, for example, 1024, the H filter can contain coefficients comprising 1024 2×2 complex-valued matrices. This example comprises 8096 real values. When each of these coefficients is tracking the impairments of the signal at hundreds of kHz or MHz, there is insufficient time for noise filtering (e.g., averaging) in the values of the coefficients. 8096 noisy coefficients can significantly degrade the quality of the signal being filtered and thus degrade the performance of the system.

In exemplary embodiments, the H filter of the digital signal processing system 228 may be configured (e.g., with a "supercharger") to suppress the portions of an update outside of a time domain window that is significantly narrower than the time duration of the full equalizer. For instance, in one or more embodiments, one or more aspects of the equalizer described in U.S. Pat. No. 8,385,747 (which issued on Feb. 26, 2013 and is incorporated herein by reference in its entirety) may be employed in one or more systems/receivers described herein. As an example, one or more aspects of the supercharger 84 described in U.S. Pat. No. 8,385,747 may be utilized in or leveraged by the H filter of the receiver 200 of FIG. 2A herein. One purpose of the aforementioned suppression may be to allow fast tracking of polarization effects, with, for example, the aforementioned 8096 coefficients, while not suffering from the degradation which would occur if the full time duration is tracked at that speed. For example, in a system with 1024 FFT bins in the frequency domain, the time domain window might be 33 samples long. Here, if a rectangular window is used, this reduces the noise energy in each of the 8096 real frequency domain coefficients by a factor of 1024/33. Time domain equalization methods are generally limited to a relatively short time domain interval, which might also be about 33 due to implementation gate count and coefficient noise.

In certain embodiments where the supercharger '84' of U.S. Pat. No. 8,385,747 is employed in the receiver 200 described herein, the supercharger may perform dynamic tracking at response rates of, for instance, hundreds of kHz or even some low MHz. There may be, for instance, thousands of (e.g., 8096) real coefficients in the frequency domain for such speeds. In various embodiments, the supercharger may dramatically reduce the dimensionality of what's being tracked, which can provide massive noise filtering on those coefficients.

What is being tracked at high speed generally has a much smaller number of dimensions—e.g., 33 out of 1000, which equates to 33 consecutive time domain samples, whose correspondence in the frequency domain is a broad smoothing of the characteristic. As a specific example, a multiplication by a rectangular time window produces the corresponding SINC convolution in the frequency domain, which smooths the frequency response. This means that the part that gets tracked at high speed has smooth characteristics in the frequency domain, which can also be referred to as low finesse.

Notwithstanding, other characteristics of a received signal in the frequency domain may have sharp or vertical edges (e.g., a rectangular shaped signal). More particularly, in exemplary embodiments, the optical signal transmitted by a transmitter device may be generated using FDM. FDM involves digitally dividing up the modulated optical spectrum into a plurality of subcarriers, each with a different center frequency, and using each subcarrier to transmit a signal that is representative of a respective stream of symbols. In this manner, a plurality of symbol streams may be simultaneously communicated, in parallel, over the optical communication channel. A typical FDM implementation involves sufficiently separating the frequencies of the subcarriers such that the bandwidths of the signals do not significantly overlap. Each subcarrier would then correspond to a different FDM sub-band, also referred to as an FDM channel.

It is desirable to pack FDM (and/or WDM) signals very close to each other, such that, for instance, roll-off factor $\rho=0.000$ with no guard bands, while not suffering from distortion due to neighboring signal energy. This helps to improve system spectral efficiency. However, non-zero $f_{IF}$ at a coherent optical receiver can result in such distortion. More particularly, while a transmitting laser in the transmitter and the local oscillator laser in the receiver might nominally be the same, their exact frequencies are continuously changing during operations due to dithering effects. This results in a non-zero frequency difference between the two lasers—i.e., a non-zero $f_{IF}$.

Figure 2B:
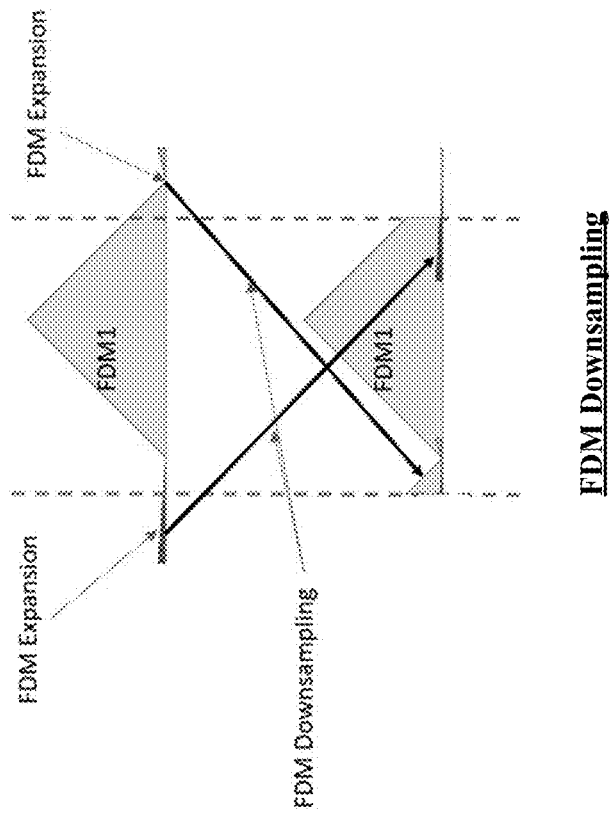
FIG. 2B illustrates how frequency division multiplexing (FDM) downsampling at an optical receiver affects an FDM signal in the frequency domain for a non-zero intermediate frequency (IF), in accordance with various aspects described herein.

FIG. 2B illustrates how FDM downsampling at an optical receiver affects an FDM signal in the frequency domain for a non-zero $f_{IF}$, in accordance with various aspects described herein. While the diagram of FIG. 2B shows a classical triangular shape for the FDM signal(s), this is for purposes of illustration only. It will be understood and appreciated that the actual shape of the FDM signal received at an optical receiver may be rectangular or the like with sharp/vertical edges, as described above. FDM downsampling adds to the highest bins of the FDM, those bins that are the FDM baud rate lower in frequency, and adds to the lowest bins of the FDM, those bins that are the FDM baud rate higher in frequency. The result of the downsampling is the frequency domain version of what, in the time domain, are symbol-spaced samples of one FDM signal.

Figure 2C:
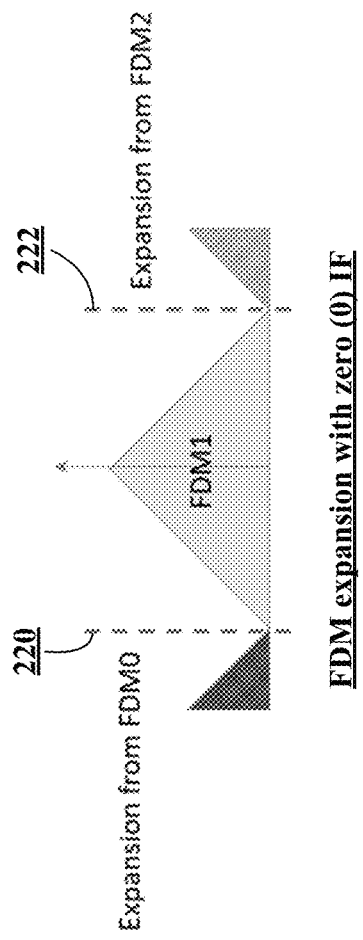
FIG. 2C illustrates FDM expansion of neighboring FDMs in a case where IF is zero relative to a case where IF is non-zero, in accordance with various aspects described herein.
Figure 2C:
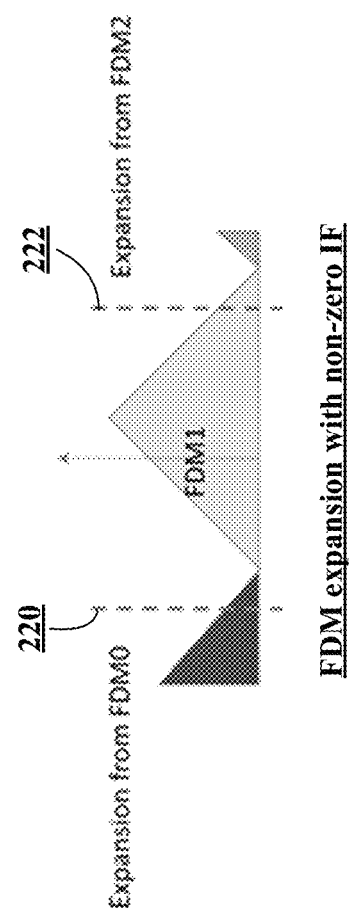

When the IF shifts, which it continuously does over time (i.e., the value of IF keeps shifting back and forth about zero (0) IF), the above-described sharp/vertical edges of FDMs may also shift as well. FIG. 2C illustrates FDM expansion of neighboring FDMs in a case where $f_{IF}$ is zero relative to a case where $f_{IF}$ is non-zero, in accordance with various aspects described herein. The dashed lines 220 and 222 at the edges of FDM1 in FIG. 2C identify the delineations between FDM1 and its neighbors FDM0 and FDM2, respectively. As with FIG. 2B, here, it will similarly be understood and appreciated that the actual shape of the FDM signals received at an optical receiver may be rectangular or the like with sharp/vertical edges, as described above. In any case, the FDMs shown correspond to the transmission of parallel frequency domain signals that are all modulated on the same transmitting laser. As may be apparent in FIG. 2C, the FDMs may not be separated by any guard bands (e.g., zero guard bands) or may be separated by very small guard bands (e.g., guard bands that have less than the peak-to-peak variation in IF, such as guard bands that are less than about 2 GHz in size). For example, four or eight FDMs may be packed tightly together with little to no gaps in between them. As shown in FIG. 2C, a non-zero IF can result in the (e.g., entire) spectrum of the FDM signal being shifted in frequency one way or the other.

Optimally, the entirety of the signal energy of FDM1 is captured. However, with frequency shifting caused by non-zero IF, energy from the neighbors FDM0 and/or FDM2 may shift or expand into the areas between the dashed lines and energy of the FDM1 signal itself may shift or expand beyond the dashed line(s). One of these cases is shown in the non-zero IF diagram in FIG. 2C. Here, static processing/filtering "at" the right dashed line can result in data loss since a portion of the energy of FDM1 has shifted to higher frequencies. Similarly, static processing/filtering "at" the left dashed line would be interfered with by energy from FDM0 since a portion of the energy of FDM0 has also shifted to higher frequencies.

The above-described supercharger may not necessarily be capable of tracking the fine resolution, sharp/vertical edge of a given FDM due to the smoothness of the high speed response. For instance, while LMS might be able to track sharp/vertical edges (fine granularity) at a much slower response, there is room for improvement. Fine granularity in the frequency domain generally has to be slow in order for time averaging (or equivalently, filtering) to reduce the total noise of (e.g., all of) the coefficients. Also, fine frequency finesse inevitably implies long impulse responses. The supercharger operation in the H filter can result in adjustments of terms with equivalently fine frequency finesse in the H filter to be much slower than those terms with a short impulse response, if those fine terms are adjustable at all.

In exemplary embodiments, the equalization processing of the digital signal processing system 228 may include yet another layer of equalizer filtering (referred to herein as an "X filter") that introduces "fine granularity" in the frequency domain as well as provides high frequency tracking of signal (e.g., FDM signal) edges.

In the frequency domain, if $f_{IF}$ is not an integer multiple of FFT bin separation, the energy of each FDM subcarrier may spread to neighboring FDM subcarriers through SINC filter convolution, causing interference distortions. Handling such SINC effects in digital signal processing requires a high-speed circuit exploiting the out-of-band spread of each FDM subcarrier signal energy as well as removing the interference generated from neighboring FDM subcarriers through SINC convolution on the current FDM subcarrier. It is believed that no present digital processing systems are capable of handling these SINC effects at the required high tracking speeds. Various embodiments of the X filter, as described herein, are capable of addressing such SINC effects.

Tracking of FDM signal edges at a sufficient speed that accommodates for the changing IF is important to ensure that filtering for a given FDM is performed at or near the proper edges of a continuously shifting FDM. It is believed that no present digital processing systems track filtering at fine resolution and at fast enough speeds to respond to changes in the IF. Various embodiments of the X filter, as described herein, are capable of tracking signal edges at high enough speeds to respond to such changes in the IF. In one or more embodiments, the high frequency tracking may be associated with a small number of coefficients—e.g., 17 coefficients on each edge of an FDM signal.

Hardware implementations generally need to balance gate-count versus performance. Ignoring most of the implementation constraints, the X filter coefficients can be defined as a function of the Intermediate Frequency $f_{IF}$. A comprehensive result can be obtained by considering the global problem. In the case of a received signal comprising 8 FDM subcarriers, for instance, the global problem is an 8×8 MIMO with Nyquist duplication of frequencies that are the FDM-Baud-rate apart in each signal. Under non-zero laser IF ($f_{IF}$), we expect the 8×8 MIMO channel to deviate from the identity matrix, as cross-talk or interference across FDM subcarriers brings in non-zero non-diagonal elements to the matrix. This MIMO problem can be solved by well-known methods, but the solutions are generally too messy to be illustrative. Instead, for the sake of illustration, the solutions shown/discussed herein simply consider the local filtering near each edge between FDMs. Below are example calculations of desirable linear filtering coefficients for the frequencies near the edge of two adjacent FDMs, as a function of the Intermediate Frequency $f_{IF}$. For clarity of this example, it is assumed that all of the FDMs have equal symbol rates and equal spectral shapes.

Here, define N to be the total number of FFT bins, and W to be the number of FFT bins corresponding to the symbol rate of each FDM.

Calculate an impulse response corresponding to the desired spectral shape, $H_{FDM}$, for each FDM (advantageously, the result of a matched filter at zero IF offset). Convert to a time-domain impulse response:

$$h[t] := \text{IFFT}(H_{FDM}[f])$$

Apply the laser IF frequency offset, $f_{IF}$, to this impulse response. This SINC frequency interpolation can be conveniently performed in the time domain as the frequency offset is not generally an integer number of FFT bins.

$$h_F[t] := h[t] \cdot e^{j2\pi f_{IF} t}$$

Calculate the effective frequency-domain response by applying a Fourier transform:

$$H_W[f] := FFT(h_{IF}[t])$$

Calculate the signal power spectrum:

$$P_S[f] := |H_W[f]|^2$$

Calculate the positive interferer power spectrum:

If FDM is NOT the positive outer FDM, then:

$$P_P[f] := P_s[f - W \bmod N]$$

Else: (There exists no positive interferer)

$$P_P[f] := 0$$

Calculate the negative interferer power spectrum:
If FDM is NOT the negative outer FDM, then:

$$P_N[f] := P_S[f + W \bmod N]$$

Else: (There exists no negative interferer)

$$P_N[f] := 0$$

Calculate the channel noise spectrum, assuming white in this example:

$$P_0[f] := \frac{1}{10^{\frac{SNR}{10}}}$$

Calculate total noise+interference spectrum:

$$P_Z[f] := P_N[f] + P_P[f] + P_0[f]$$

Calculate the Wiener filter solution including the maximum ratio combining for this specific FDM (e.g., calculate the maximum ratio combining Wiener filter as):

$$H_O[f] := \frac{\frac{H_W[f] \cdot \sqrt{|H_W[f]|^2 + |H_W[f \pm W]|^2}}{P_Z[f]}}{1 + \frac{P_P[f]}{P_Z[f]} + \frac{P_P[f \pm W]}{P_Z[f \pm W]}}$$

It will be understood and appreciated that the foregoing example X filter solution can be implemented with precalculation, calculated "on the fly," learned, or otherwise approximated. Other forms of interpolation and/or extrapolation can be used. An advantageous implementation may precalculate the relevant elements of $H_O[f]$ and place those elements in a lookup table (LUT) that is addressed by a quantized estimate of $f_{IF}$. After each clock cycle, or every few clock cycles, the current estimate of $f_1$ may be used to select the coefficients that should currently be used. At a slower rate, say every 128 clock cycles, an approximation to the above calculation could be executed to calculate the coefficients that should currently be used. The $H_O[f]$ could be learned, such as by a CMA, LMS, or RLS algorithm, where the supercharger block discussed above can be modified to allow fine finesse for just the relevant FFT bins. The broad finesse may (e.g., must) be kept for the vast majority of bins to preclude excessive signal degradation due to noisy coefficients.

Embodiments of the X filter advantageously provide fine-finesse high-speed tracking of a small number of frequency terms of an equalizer to mitigate the effect of laser frequency transients on a gapless FDM system. In this way, FDMs (and/or WDMs) may be "closely packed" with one another despite the above-described sharp/vertical edge-related issue that may arise as a result of such packing.

It will be understood and appreciated that a wide enough gap in between FDMs would generally eliminate the problem that the X filter addresses. Thus, the X filter may be particularly applicable or useful in situations where there are no guard bands between FDMs or where FDMs are separated by very small guard bands (e.g., guard bands that have less bandwidth than the peak-to-peak variation in IF).

In exemplary embodiments, the X filter may be configured to perform filtering for each FDM signal (i.e., each individual FDM signal of a multiple-FDM system). For instance, X filter coefficients for each FDM signal may be determined using LMS function(s). Assume, as a non-limiting example, that there are 1280 FFT bins across the spectra of a given FDM signal, where p=0.000 and oversampling N=5/4. In this example, and for simplicity of explanation, the FFT bins may be in order of frequency as follows: f=−639 to f=+640, with $f_{DC}$=0. Here, (e.g., rectangular) cut-off edges of the signal may be at f=−4*1280/5/2+1=−511 and at f=+512.

In one or more embodiments, the X filtering may be centered at the edges of a given FDM signal. Here, K bins may be centered at each of the two edges as X filter zones. In embodiments where the X filter is upstream of the H filter, more digital gates may be required for the X filter in addition to gates needed for the H filter. High speed tracking by the X filter can thus be resource intensive (or expensive), and so the number of bins K to use for each of the two edges should generally be small relative to the total number of FFT bins across the spectra. For instance, in the above mentioned example where there are 1280 FFT bins, the value of K should be in the range from 12 to 48. In some embodiments, the value of K may depend on the desired frequency shift for the X filtering—e.g., a shift of 1 GHz in frequency may correspond to a particular number of FFT bins and thus K may be set to that number (or to a value that is within a threshold of that number). As an example, if 1280 FFT bins wide corresponds to a 50 GBaud FDM symbol rate, a 1 GHz peak-to-peak IF deviation would need 26 bins (1280/50=25.6). For hardware efficiencies, this might be lowered to K=24 or K=16. As the spectra is shifted due to a laser transient, the X filter can rapidly respond and perform filtering of each FDM signal.

In various embodiments, and as discussed above, desired coefficients for the X filter may be predetermined and prestored in a data structure (e.g., a lookup table or the like) along with corresponding IF values. The IF can be (e.g., continuously) tracked/estimated, where coefficients corresponding to the estimate of the IF can be obtained/read into the X filter. In essence, the location of a brick-wall edge of an FDM signal can be controlled by an estimate of the IF. This allows the X filter to provide desired equalization for each of different locations between bins of the brick-wall edge of the signal—e.g., at hundreds of KHz or several MHz in speed.

In certain embodiments, the X filter can be configured to filter only inside of the edges of an FDM signal at zero IF. That is, all of the FFT bins for the X filter can be inside of the edges of the FDM signal. While this might result in slightly lower performance, it allows the value of K to be half as large relative to the value of K in the aforementioned case where the X filtering is otherwise centered at the edges of the FDM signal. For example, the value of K may be in the range from 6 to 24. In some embodiments, the C filter may be used to zero (or otherwise filter) the energy outside of the edges.

In alternate embodiments, the X filter can be configured to filter only outside of the edges of an FDM signal at zero IF. Here, the X filter may only operate outside of the nominal structure, thus similarly allowing the value of K to be half as large relative to the value of K in the aforementioned case where the X filtering is otherwise centered at the edges of the FDM signal. For example, the value of K may be in the range from 6 to 24.

Since multiplication is commutative and associative, a plurality of coefficients that are to be applied to one FFT bin can be multiplied together before multiplying that FFT bin of the signal. Alternatively, they can sequentially multiply that FFT bin. Specifically, an X filter coefficient can be applied through modification of a C filter multiplication, or through modification of an H Filter multiplication, or with its own multiplication. The X filter multiplication can be done in parallel to, and instead of, the H filter multiplication. Quasi-static or scaling aspects might be separated from the high-speed aspects. Cartesian coordinates are used in the examples here, for clarity. Polar coordinates or other coordinate systems can be used. The choices between any such mathematical equivalents can depend upon the hardware and control implications.

In one or more embodiments, the X filter may be used to optimize the frequency bins used for each FDM. For a zero IF, the X filter coefficients may be controlled towards zero. However, for a positive IF, the X filter coefficients may be defined to pass the signal energy on the positive side of the FDM spectrum and to block noise by decreasing the signal energy on the negative side of the FDM spectrum.

Figure 2D:
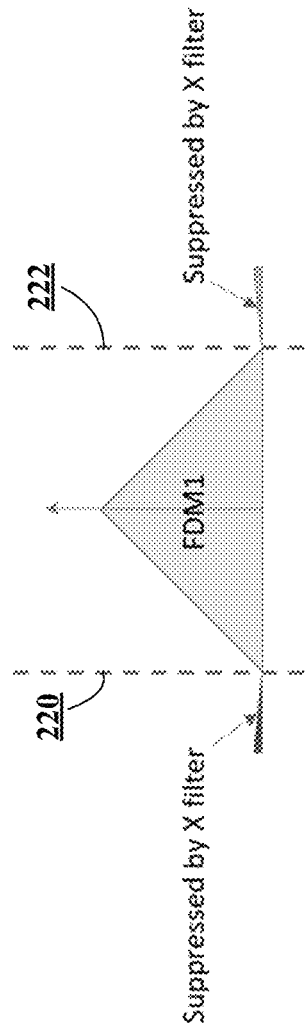
FIG. 2D illustrates X filtering of FDM expansions at edges of an FDM signal for zero IF and non-zero IF, in accordance with various aspects described herein.
Figure 2D:
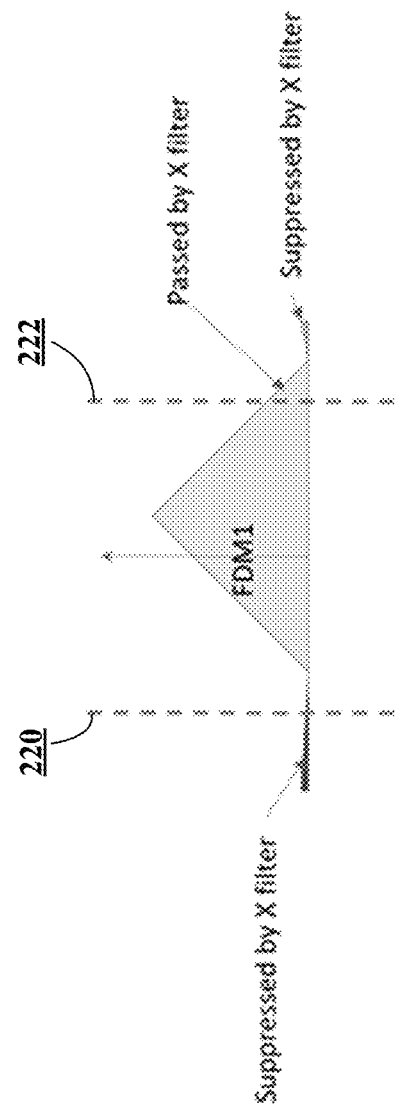

FIG. 2D illustrates X filtering of FDM expansions at edges of an FDM signal for zero IF and non-zero IF, in accordance with various aspects described herein. As shown in FIG. 2D, in a case of zero IF, energy from neighbor FDMs may be suppressed by the X filter, and in a case of non-zero IF, portions of energy of neighbor FDMs may be suppressed by the X filter and other portions passed by the X filter.

In one or more embodiments, a frequency finesse of the X filter may be per FFT bin. Even though the laser IF is continuously moving and thus may move much more finely than per FFT bin, it is nevertheless believed to be a reasonable finesse. In alternate embodiments, the frequency finesse of the X filter may be per an integer multiple of an FFT bin—e.g., per 2 FFT bins, per 4 FFT bins, per 5 FFT bins, etc. or per a certain correlation function across 2 FFT bins, 4 FFT bins, 5 FFT bins, etc.

The fine finesse of the X filter can be contrasted to that of the H filter. Particularly, while the H filter may have a smooth filtering characteristic such that the finesse of its coefficient updates are much less than an individual FFT bin itself, the H filter's responses are much broader than per FFT bin. For instance, while the H filter may have 16 or 32 degrees of freedom across 1024 FFT bins, the responses are much broader—e.g., they may cover 30, 50, or 60 FFT bins, where all 1024 FFT bins may be adjusted, but the adjustments may be the same for a given FFT bin and its 30 or 50 neighboring FFT bins and yet much different from adjustments of FFT bins that are further away. As an example, the H filter's response may be smooth in frequency such that the variation of the H-filter's response across neighboring 30 . . . 60 FFT bins is very small.

Figure 2E:
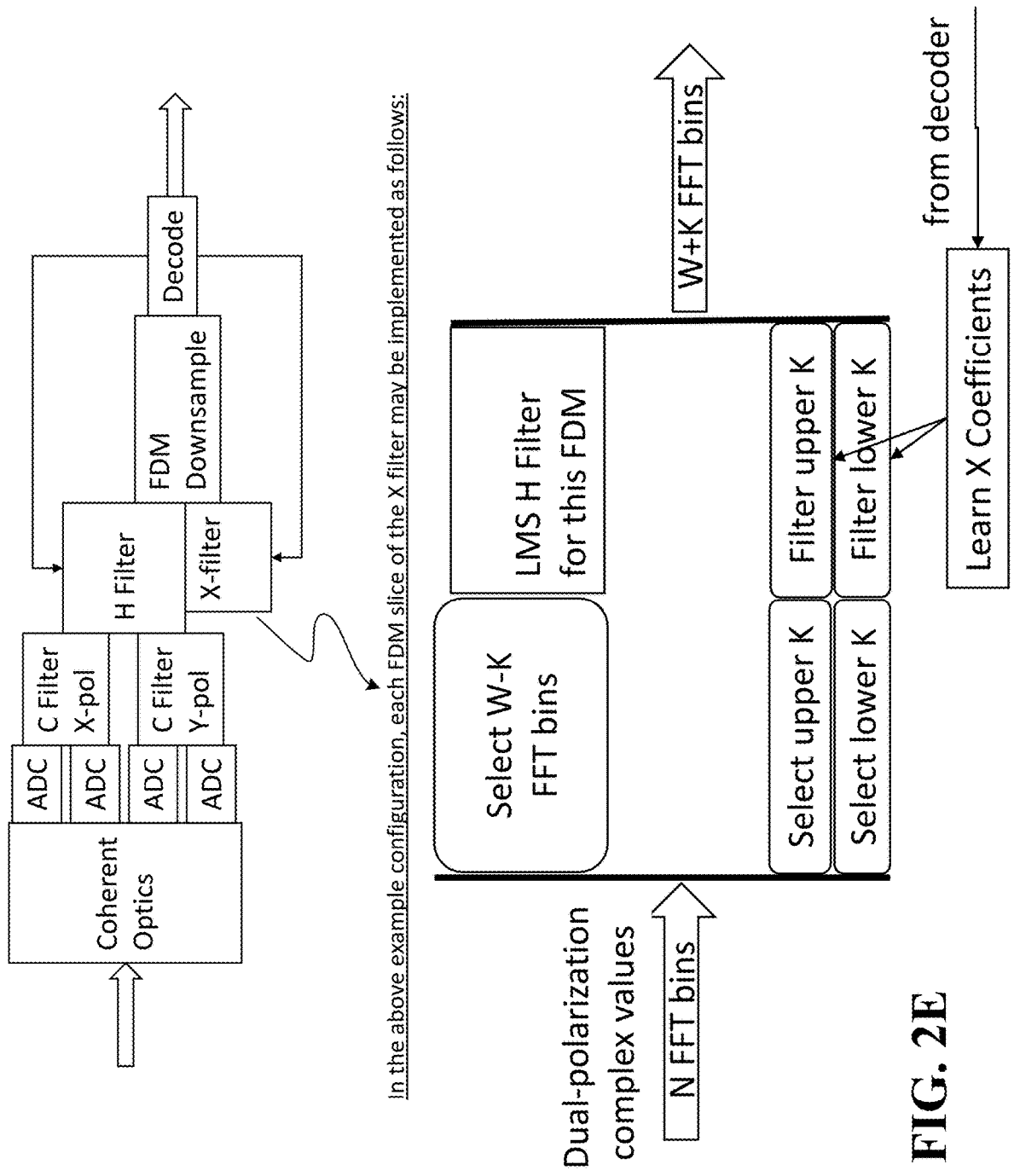
FIG. 2E illustrates an example, non-limiting embodiment of a coherent optical receiver with an X filter implemented in parallel with an H filter, in accordance with various aspects described herein.
Figure 2F:
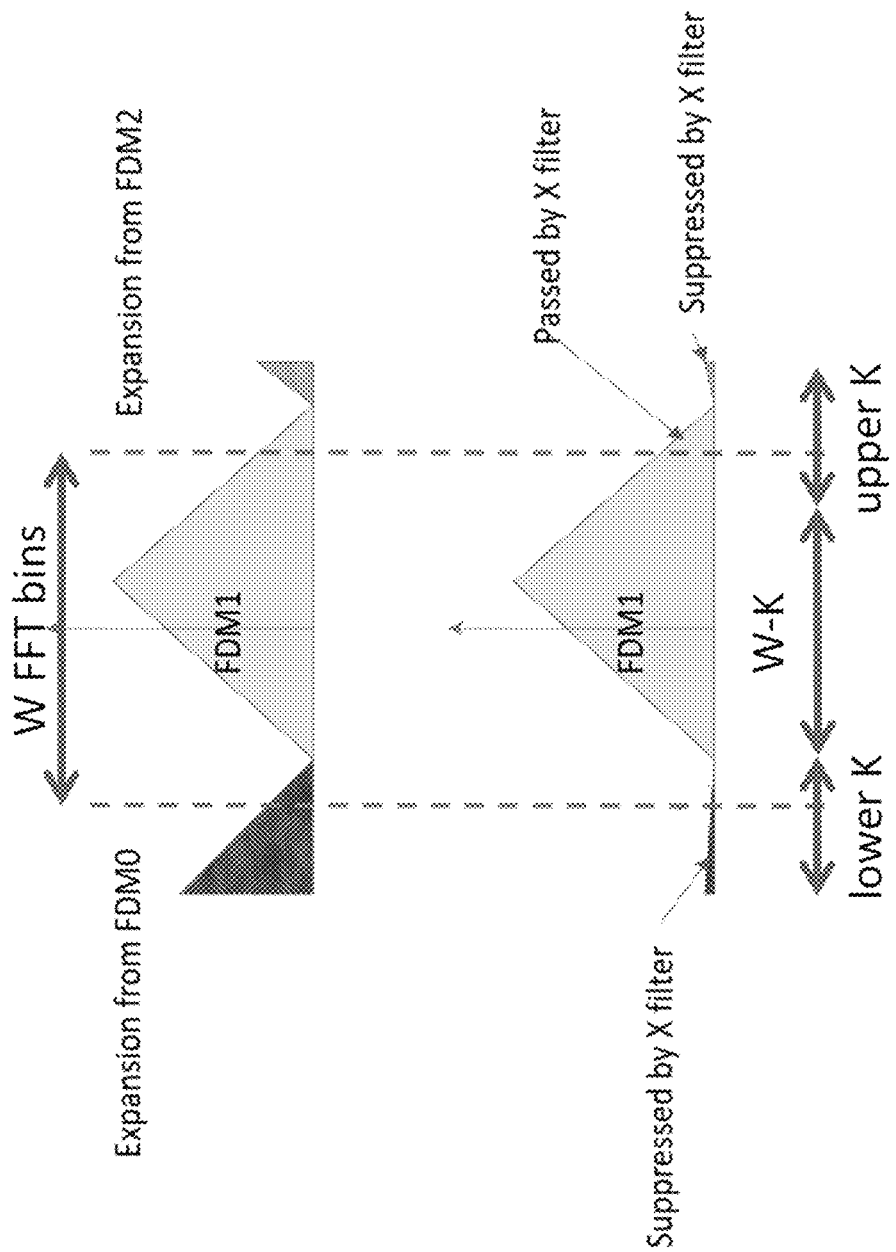
FIG. 2F illustrates how values may be defined for the X filter—namely the number W of FFT bins and the choice K for upper and lower bins—in accordance with various aspects described herein.

The X filter may be partially or entirely integrated with the H filter or separate from the H filter. In certain embodiments, the X filter may be implemented in parallel with the H filter. In one or more embodiments, the aforementioned supercharger may be modified to provide X filtering functionality. In these embodiments, the X filter functionality may be in parallel to the H filter. FIG. 2E illustrates an example, non-limiting embodiment of a coherent optical receiver with an X filter implemented in parallel with an H filter in accordance with various aspects described herein. FIG. 2F illustrates how values may be defined for the X filter namely the number W of FFT bins and the choice K for upper and lower bins—in accordance with various aspects described herein. The supercharger is a smoothing function for LMS updates to coefficients for the H filter. In some embodiments, the supercharger may be modified so as to not suppress aspects of the updates of H filter coefficients. This means that certain FFT bins may be selected to not be subjected to the smoothing, but rather to have high finesse and updated at a higher speed. As an example, out of 1024 FFT bins, K upper and K lower FFT bins may be specially designated. The frequency domain LMS can then control coefficients for each of these 2*K FFT bins so as to achieve high-speed tracking. Since updates of these particular 2*K coefficients would not be suppressed (or would not be significantly suppressed) by the supercharger, sharp frequency delineation may be achieved simultaneously with fast tracking.

As K is much smaller than the size of the FFT, there is minimal performance impact on the total signal from coefficient noise. This is in contrast to otherwise performing high-speed updates for all 1024 bins, since this would result in excess coefficient noise due to the high tracking speed, and thus cause too much penalty on the overall FDM signal. In any case, the foregoing implementation of the X filter via a modified supercharger can provide a full-rate adjustment to a small number of fine frequency finesse terms.

Figure 2G:
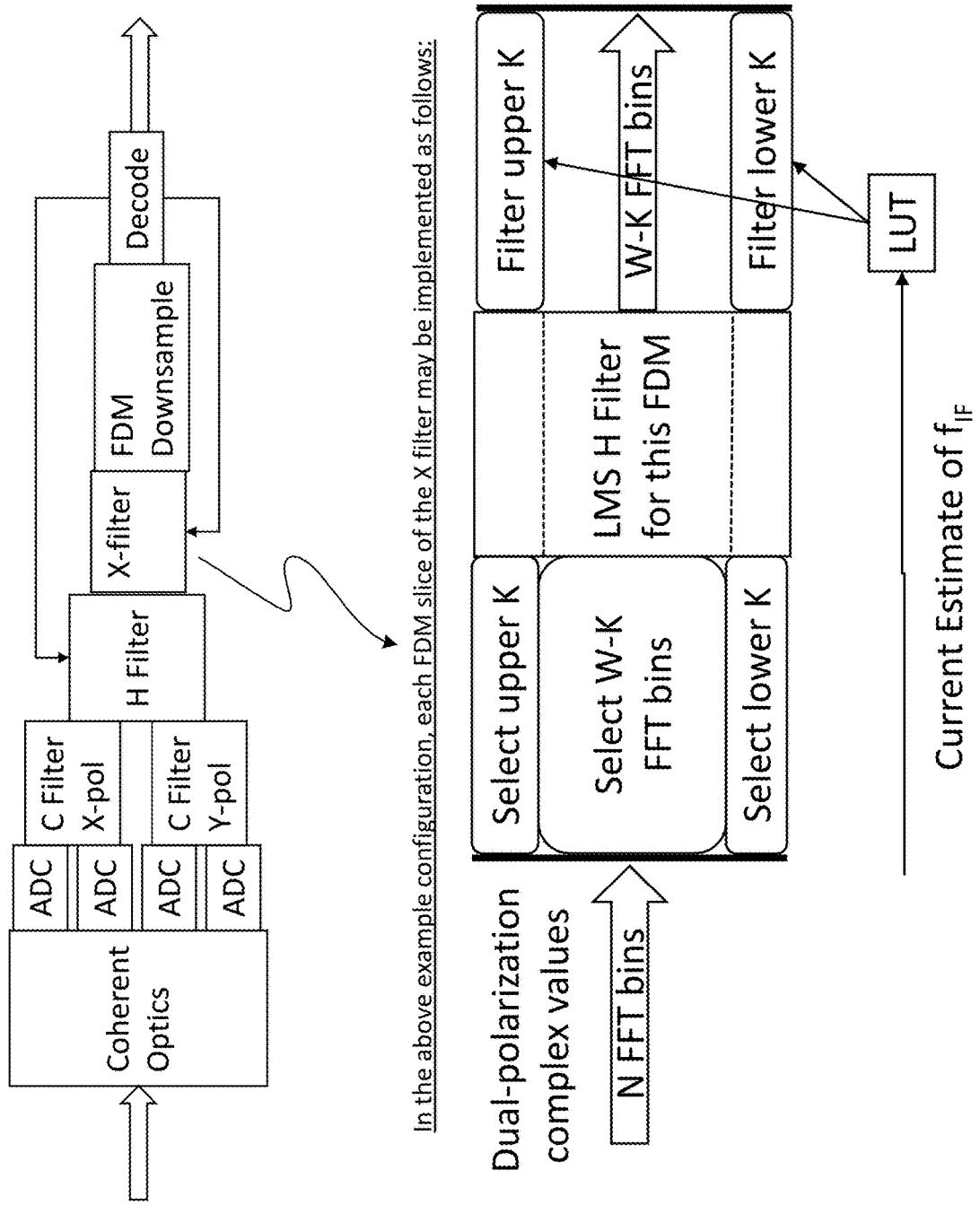
FIG. 2G illustrates an example, non-limiting embodiment of a coherent optical receiver with an X filter implemented downstream of an H filter, in accordance with various aspects described herein.
Figure 2H:
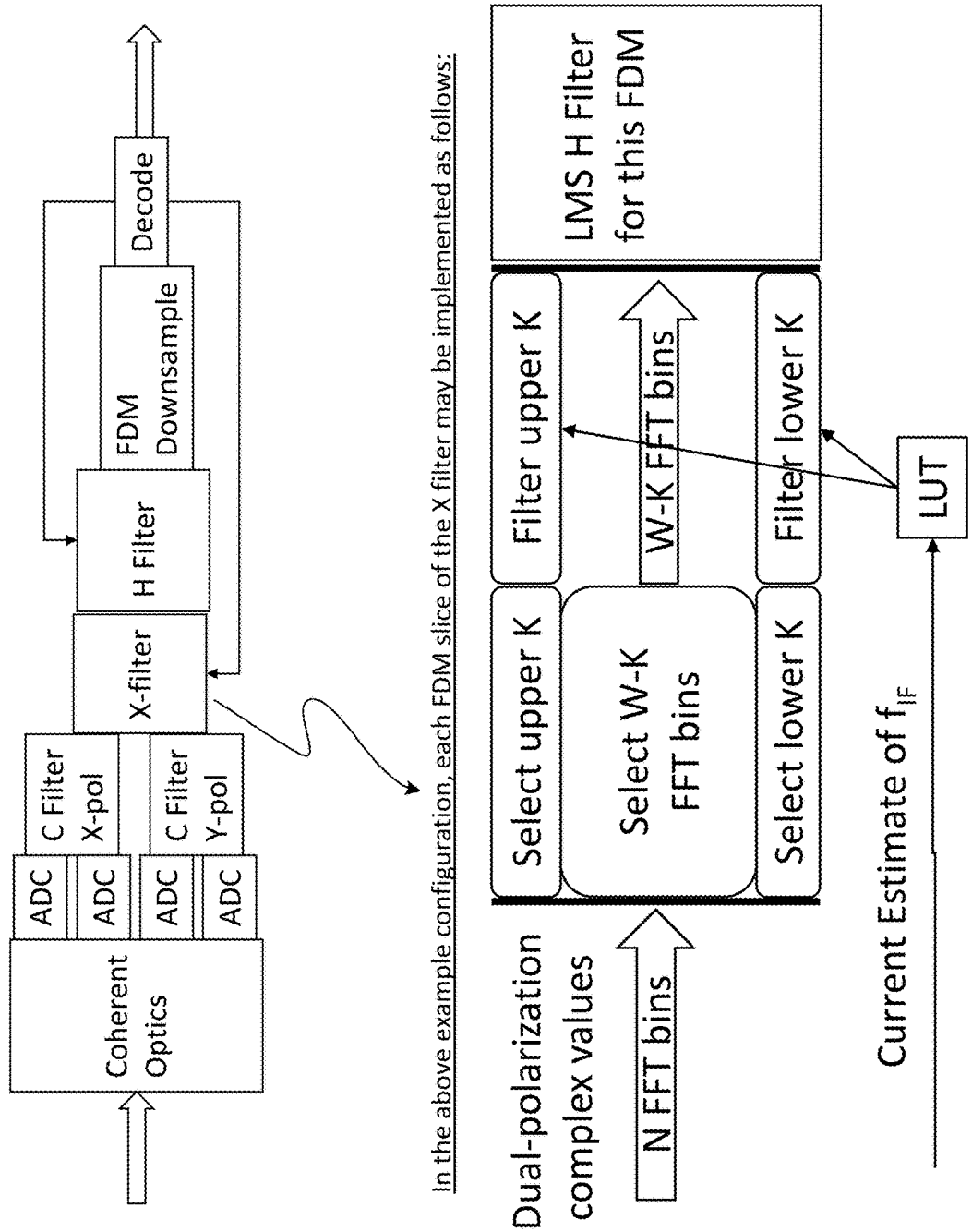
FIGS. 2H and 2I illustrate an example, non-limiting embodiment of a coherent optical receiver with different implementations of an X filter that is upstream of an H filter, in accordance with various aspects described herein.
Figure 2I:
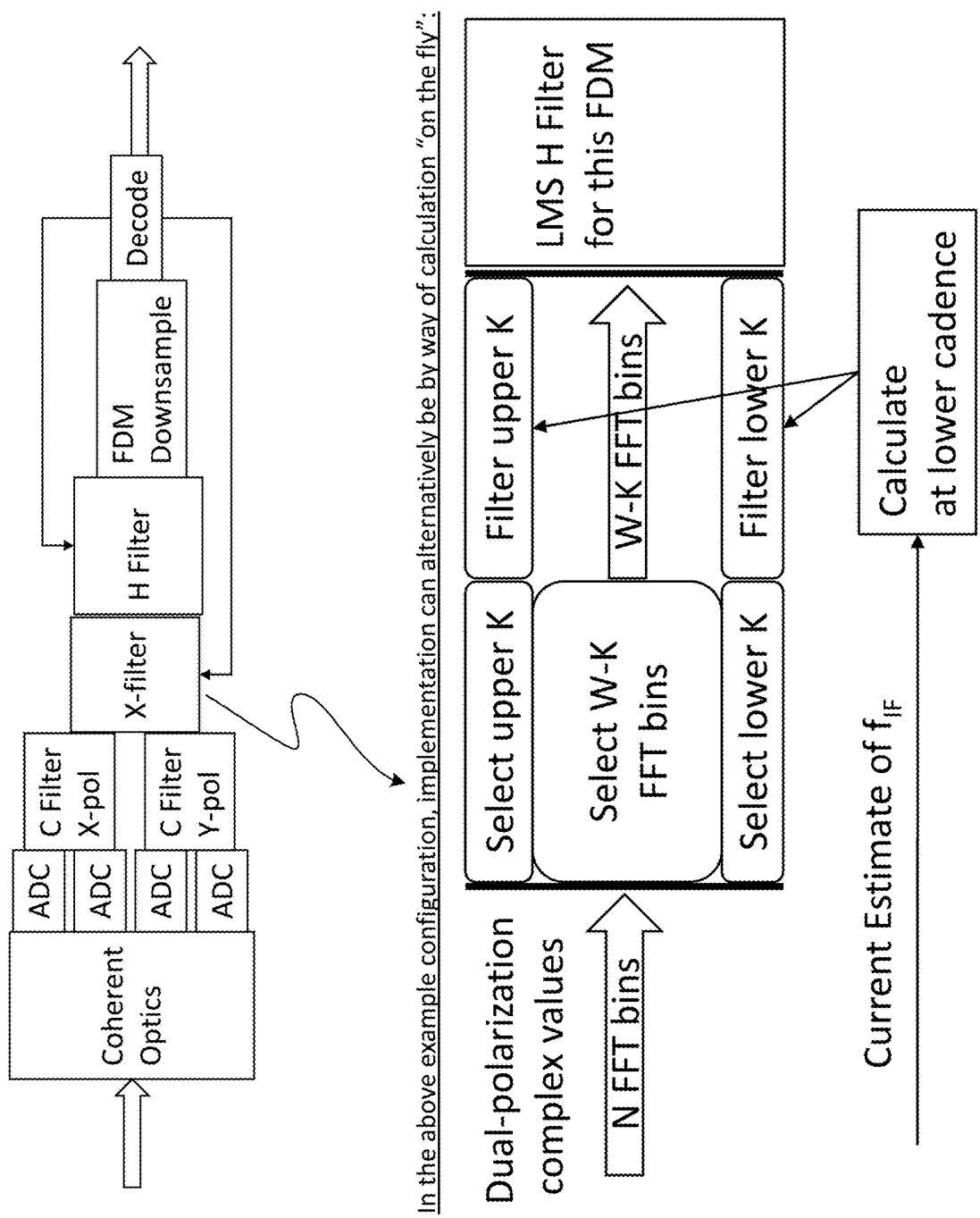

In various embodiments, the X filter may be implemented downstream or upstream of the H filter. FIG. 2G illustrates an example, non-limiting embodiment of a coherent optical receiver with an X filter implemented downstream of an H filter, in accordance with various aspects described herein. FIGS. 2H and 2I illustrate an example, non-limiting embodiment of a coherent optical receiver with different implementations of an X filter that is upstream of an H filter, in accordance with various aspects described herein. In the embodiments shown in FIGS. 2G, 2H, and 2I, the X filter may have its own control—e.g., based on LMS, RLS, approximated RLS, constant modulus, etc.—where coefficients for a small (e.g., preselected) number of frequency bins may be updated at a higher speed and at higher finesse.

In various embodiments, the X filter coefficient updates may be driven by the estimate of the IF and/or other control parameters. Thus, SINC interpolation can be controlled by the estimate of the IF. For instance, as discussed above, desired coefficients for the X filter may be stored in a lookup table along with corresponding IF values. In one or more embodiments, the IF estimate may be obtained from a carrier recovery function of the decoder. It is to be understood and appreciated that gradient methods or other methods may be used for any of the control parameter(s). In any case, the LUT may be driven to generate coefficients for the X filter as a specific response to the IF, where the outputs of the X filter may then be multiplied by the H filter (see FIG. 2H).

In various embodiments, each X filter coefficient may be independently controlled. In some embodiments, the coefficients may be coupled or subspace controlled. In one or more embodiments, a straight-line vs. frequency can be controlled by (e.g., only) its slope. For example, if the X filter bins are integer numbered from f=−8 to f=+8, then X[f]:=minimum(1.0, maximum(0.0, 0.5+slope*f)).

While the X filter has been described as being configured to suppress energy of neighboring FDMs based on tracking of the IF, there are additional applications of the X filter and/or additional effects that the X filter can provide. As an example, the ability of the X filter to react to optical edges with finer finesse allows for a more gentle roll-off (i.e., more gentle than an FFT) at edges of the spectrum that may be "damaged" by amplifiers and/or optical filters (e.g., wavelength selective switches) on the propagating signal. For instance, the X filter may repair damage that is done by such amplifiers and/or optical filters.

In exemplary embodiments, the X filter is advantageously used with a rectangular signal spectrum (i.e., $\rho$=0.000). Alternatively, the X filter can be used with non-zero values of p and with non-root-raised-cosine spectral shapes. The nominal signal spectrum may have a windowed, trimmed, or truncated impulse response.

In various embodiments, the X filter is advantageously used at the edge of a signal, for a fixed set of FFT bins. The frequency locations of the bins of the X filter may be fixed, provisioned by firmware, and/or adaptively tracked.

In various embodiments, the roll-off factor for an FDM stream (e.g., each FDM stream) may be less than a predefined value. As some examples, the predefined value may be equal to (or may be about or less than) 0.07 or 0.01. In one or more embodiments, the frequency separation between centers of neighboring FDM streams of baud rates B1 and B2 may be less than a constant multiplied by (B1+B2) in Hertz. As an example, the constants may be equal to (or may be about or less than) 0.535 or 0.505.

While a frequency domain implementation, after an FFT, is desirable and is described in examples herein, it will be understood and appreciated that a time domain finite impulse response (FIR) or matrix or other implementation may alternatively be used to implement the X filter.

Also, while the X filter is described herein as being capable of mitigating interference from neighboring signals, the X filter may be capable of additionally, or alternatively, mitigating other sources of degradation. For instance, the X filter may be capable of mitigating dynamic degradation effects over spectral ranges that have long time domain responses—e.g., a narrow spectral peak or notch, a sharp optical filter edge, a pump laser, an idler, an optical tone, an optical service channel, a four-wave mixing product of narrow sources, and/or other narrow nonlinear effects.

Two edges of one FDM have been considered and discussed herein for X filtering. Alternatively, X filtering may be implemented for only one edge of an FDM. It is to be understood and appreciated that the spectral ranges of the X filter may be non-contiguous and scattered so long as the total amount of spectrum is a small fraction of the spectral width of the signal.

For clarity, real values have been used in the examples for the X filter coefficients. However, the values can be complex or complex matrices may be used. In various embodiments, frequency domain multiplication, per FFT bin, by a complex coefficient may be employed in any of the filtering described herein. The coefficient can be amplitude only. Further, the coefficient can be only 0 or 1. Other implementations can alternatively be used.

Figure 3:
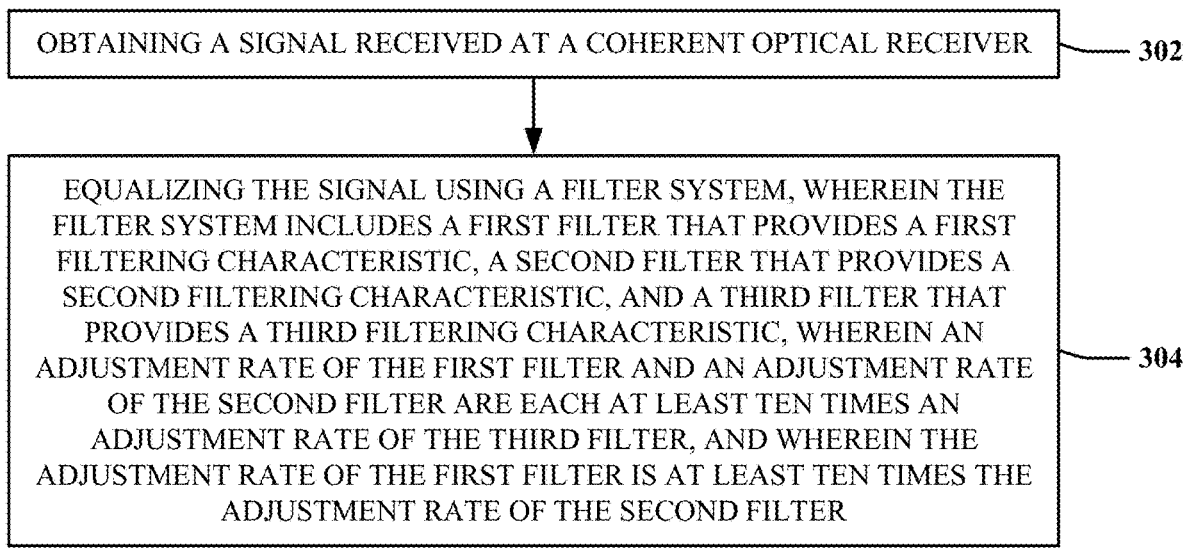
FIG. 3 depicts an illustrative embodiment of a method in accordance with various aspects described herein.

FIG. 3 depicts an illustrative embodiment of a method 300 in accordance with various aspects described herein.

At 302, the method can include obtaining a signal received at a coherent optical receiver. For example, the method may include obtaining a signal received at a coherent optical receiver 200.

At 304, the method can include equalizing the signal using a filter system, wherein the filter system includes a first filter that provides a first filtering characteristic, a second filter that provides a second filtering characteristic, and a third filter that provides a third filtering characteristic, wherein an adjustment rate of the first filter and an adjustment rate of the second filter are each at least ten times an adjustment rate of the third filter, and wherein the adjustment rate of the first filter is at least ten times the adjustment rate of the second filter. For example, the method may include equalizing the signal using a filter system, wherein the filter system includes an X filter that provides a first filtering characteristic, an H filter that provides a second filtering characteristic, and a C filter that provides a third filtering characteristic, wherein an adjustment rate of the X filter and an adjustment rate of the H filter are each at least ten times an adjustment rate of the C filter, and wherein the adjustment rate of the X filter is at least ten times the adjustment rate of the H filter. For example, the C filter may be adjusted at one Hertz, the X filter may be adjusted at one Megahertz, and most of the dimensions of the H filter may be adjusted at 10 Kilohertz. Through the aforementioned (e.g., modified) supercharger, a small number of other dimensions of the H filter may have faster adjustments, e.g., 600 Kilohertz or 2 Megahertz. Thus, a filter can have more than one adjustment rate. In other words, while the tracking speed of the H filter has been described as being significantly slower than the tracking speed of the X filter, in certain embodiments, dimensions (e.g., some or all dimensions) of the tracking of the H filter may not necessarily be significantly slower than the tracking speed of the X filter. Notwithstanding, the frequency finesse of the H filter may still be coarser than that of the X filter. For instance, in exemplary embodiments, the frequency finesse of the X filter may be at least four times finer than the frequency finesse of the H filter. In some embodiments, the frequency finesse of the X filter may be at least eight times finer than the frequency finesse of the H filter.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

One or more aspects of the subject disclosure include a method, comprising obtaining a signal received at a coherent optical receiver, and equalizing the signal using a filter system, wherein the filter system includes a first filter that provides a first filtering characteristic, a second filter that provides a second filtering characteristic, and a third filter that provides a third filtering characteristic, wherein an adjustment rate of the first filter and an adjustment rate of the second filter are each at least ten times an adjustment rate of the third filter, and wherein the adjustment rate of the first filter is at least ten times the adjustment rate of the second filter.

One or more aspects of the subject disclosure include a device, comprising a processing system including a processor, and a memory that stores executable instructions that, when executed by the processing system, facilitate performance of operations. The operations may include obtaining a signal received at a coherent optical receiver, and equalizing the signal using a filter system, wherein the filter system includes a first filter that provides a first filtering characteristic, a second filter that provides a second filtering characteristic, and a third filter that provides a third filtering characteristic, wherein an adjustment rate of the first filter and an adjustment rate of the second filter are each at least ten times an adjustment rate of the third filter, and wherein the adjustment rate of the first filter is at least ten times the adjustment rate of the second filter.

One or more aspects of the subject disclosure include a non-transitory machine-readable medium, comprising executable instructions that, when executed by a processing system including a processor, facilitate performance of operations. The operations may include obtaining a signal received at a coherent optical receiver, and equalizing the signal using a filter system, wherein the filter system includes a first filter that provides a first filtering characteristic, a second filter that provides a second filtering characteristic, and a third filter that provides a third filtering characteristic, wherein an adjustment rate of the first filter and an adjustment rate of the second filter are each at least ten times an adjustment rate of the third filter, and wherein the adjustment rate of the first filter is at least ten times the adjustment rate of the second filter.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
 a coherent optical receiver system configured to receive optical signals; and
 a filter system configured to equalize the optical signals,
  wherein the filter system includes a first filter that provides a first filtering characteristic, a second filter that provides a second filtering characteristic, and a third filter that provides a third filtering characteristic,
  wherein an adjustment rate of the first filter and an adjustment rate of the second filter are each at least ten times an adjustment rate of the third filter, and wherein at least one of:
   a frequency finesse of the first filter is at least four times finer than a frequency finesse of the second filter,
   a contiguous frequency range of the first filter is less than a first predefined number of Fast Fourier Transform (FFT) bins,
   the frequency finesse of the first filter is per FFT bin,
   the frequency finesse of the third filter is per FFT bin,
   the frequency finesse of the second filter is greater than a second predefined number of FFT bins,
   the first filter is functionally in parallel with the second filter,
   the optical signals comprise a plurality of frequency division multiplexed (FDM) streams and a roll-off factor of each FDM stream of the plurality of FDM streams or at least one FDM stream of the plurality of FDM streams is less than a third predefined value,
   the optical signals comprise a plurality of FDM streams and a frequency separation between centers of neighboring FDM streams of baud rates B1 and B2 is less than a constant multiplied by (B1+B2) in Hertz,
   the optical signals comprise a plurality of FDM streams and a frequency gap between neighboring FDM streams is less than a peak-to-peak laser frequency deviation, or
   an estimate of an intermediate frequency (IF) is used to control the first filter and the control of the first filter comprises an interpolation.

2. The device of claim 1, wherein the first filtering characteristic relates to mitigation of laser frequency effects of the optical signals, wherein the second filter characteristic relates to mitigation of polarization effects of the optical signals, and wherein the third filtering characteristic relates to spectral shaping of the optical signals, mitigation of chromatic dispersion of the optical signals, or a combination thereof.

3. The device of claim 1, wherein the frequency finesse of the first filter is at least eight times finer than the frequency finesse of the second filter.

4. The device of claim 1, wherein the frequency finesse of the first filter is at least four times finer than a frequency finesse of the second filter, and the contiguous frequency range of the first filter is less than the first predefined number of FFT bins.

5. The device of claim 1, wherein the frequency finesse of the first filter is at least four times finer than a frequency finesse of the second filter, and the frequency finesse of the first filter is per FFT bin.

6. The device of claim 5, wherein the first predefined number of the FFT bins is thirty-three.

7. The device of claim 1, wherein another adjustment rate of the second filter is greater than half of the adjustment rate of the first filter.

8. The device of claim 7, wherein the second predefined number of the FFT bins is sixteen.

9. The device of claim 1, wherein a portion or an entirety of the first filter is downstream of the second filter.

10. The device of claim 1, wherein the contiguous frequency range of the first filter is less than the first predefined number of FFT bins, and the frequency finesse of the third filter is per FFT bin.

11. The device of claim 1, wherein the contiguous frequency range of the first filter is less than a first predefined number of FFT bins and the frequency finesse of the second filter is greater than the second predefined number of FFT bins.

12. The device of claim 11, wherein a frequency separation between centers of neighboring FDM streams of baud rates B1 and B2 is less than a constant multiplied by (B1+B2) in Hertz.

13. The device of claim 12, wherein the constant is 0.535 or 0.505.

14. The device of claim 11, wherein a frequency gap between neighboring FDM streams is less than a peak-to-peak laser frequency deviation.

15. The device of claim 1, wherein the frequency finesse of the first filter is at least four times finer than a frequency finesse of the second filter, the contiguous frequency range of the first filter is less than the first predefined number of FFT bins, and the frequency finesse of the first filter is per FFT bin.

16. The device of claim 15, wherein the third predefined value comprises 0.07 or 0.01.

17. The device of claim 1, wherein the frequency finesse of the first filter is at least four times finer than a frequency finesse of the second filter, the frequency finesse of the first filter is per FFT bin, and the frequency finesse of the second filter is greater than the second predefined number of FFT bins.

18. A method, comprising:
obtaining a signal received at a coherent optical receiver; and
equalizing the signal using a filter system,
wherein the filter system includes a first filter that provides a first filtering characteristic, a second filter that provides a second filtering characteristic, and a third filter that provides a third filtering characteristic,
wherein an adjustment rate of the first filter and an adjustment rate of the second filter are each at least ten times an adjustment rate of the third filter, and
wherein at least one of:
a frequency finesse of the first filter is at least four times finer than a frequency finesse of the second filter,
a contiguous frequency range of the first filter is less than a first predefined number of Fast Fourier Transform (FFT) bins,
the frequency finesse of the first filter is per FFT bin,
the frequency finesse of the third filter is per FFT bin,
the frequency finesse of the second filter is greater than a second predefined number of FFT bins,
the first filter is functionally in parallel with the second filter,
the optical signals comprise a plurality of frequency division multiplexed (FDM) streams and a roll-off factor of each FDM stream of the plurality of FDM streams or at least one FDM stream of the plurality of FDM streams is less than a third predefined value,
the optical signals comprise a plurality of FDM streams and a frequency separation between centers of neighboring FDM streams of baud rates B1 and B2 is less than a constant multiplied by (B1+B2) in Hertz,
the optical signals comprise a plurality of FDM streams and a frequency gap between neighboring FDM streams is less than a peak-to-peak laser frequency deviation, or
an estimate of an intermediate frequency (IF) is used to control the first filter and the control of the first filter comprises an interpolation.

19. The method of claim 18, wherein the first filtering characteristic relates to mitigation of laser frequency effects, wherein the second filter characteristic relates to mitigation of polarization effects, and wherein the third filtering characteristic relates to spectral shaping, mitigation of chromatic dispersion, or a combination thereof.

20. A non-transitory machine-readable medium, storing executable instructions that, when executed by a processing system including a processor, facilitate performance of operations, the operations comprising:
obtaining a signal received at a coherent optical receiver; and
equalizing the signal using a filter system,
wherein the filter system includes a first filter that provides a first filtering characteristic, a second filter that provides a second filtering characteristic, and a third filter that provides a third filtering characteristic,
wherein the first filtering characteristic relates to mitigation of laser frequency effects, wherein the second filter characteristic relates to mitigation of polarization effects, and wherein the third filtering characteristic relates to spectral shaping, mitigation of chromatic dispersion, or a combination thereof,
wherein an adjustment rate of the first filter and an adjustment rate of the second filter are each at least ten times an adjustment rate of the third filter, and
wherein at least one of:
a frequency finesse of the first filter is at least four times finer than a frequency finesse of the second filter,
a contiguous frequency range of the first filter is less than a first predefined number of Fast Fourier Transform (FFT) bins,
the frequency finesse of the first filter is per FFT bin,
the frequency finesse of the third filter is per FFT bin,
the frequency finesse of the second filter is greater than a second predefined number of FFT bins,
the first filter is functionally in parallel with the second filter,
the optical signals comprise a plurality of frequency division multiplexed (FDM) streams and a roll-off factor of each FDM stream of the plurality of FDM streams or at least one FDM stream of the plurality of FDM streams is less than a third predefined value,
the optical signals comprise a plurality of FDM streams and a frequency separation between centers of neighboring FDM streams of baud rates B1 and B2 is less than a constant multiplied by (B1+B2) in Hertz,
the optical signals comprise a plurality of FDM streams and a frequency gap between neighboring FDM streams is less than a peak-to-peak laser frequency deviation, or
an estimate of an intermediate frequency (IF) is used to control the first filter and the control of the first filter comprises an interpolation.

\* \* \* \* \*